(12) United States Patent
Liao

(10) Patent No.: US 6,354,545 B1
(45) Date of Patent: Mar. 12, 2002

(54) BICYCLE BRAKE CABLE RETAINING DEVICE

(76) Inventor: Ing Horng Liao, 1F, 1, Alley 16, Lane 40, Jiun Te Rd., Taichung (TW)

( * ) Notice: Subject to any disclaimer, the term of this patent is extended or adjusted under 35 U.S.C. 154(b) by 0 days.

(21) Appl. No.: 09/596,340

(22) Filed: Jun. 19, 2000

(51) Int. Cl.$^7$ .............................................. A47B 96/06
(52) U.S. Cl. ..................... 248/214; 24/336; 224/459; 248/68.1; 248/73; 248/230.8
(58) Field of Search ............... 248/51, 62, 68.1, 248/73, 74.1, 74.2, 74.3, 230.8, 214, 229.17; 224/425, 459, 424, 935; 24/336, 335, 339

(56) References Cited

U.S. PATENT DOCUMENTS

| | | | | |
|---|---|---|---|---|
| 3,893,647 A | * | 7/1975 | Kennedy | 248/68.1 |
| 4,305,578 A | * | 12/1981 | Disbrow et al. | 482/63 |
| 4,460,142 A | * | 7/1984 | O'Rorke | 248/230.8 |
| 4,669,156 A | * | 6/1987 | Guido et al. | 24/336 |
| 5,020,706 A | * | 6/1991 | Birch | 224/459 |
| 5,172,878 A | * | 12/1992 | Lederman | 248/73 |
| 5,340,069 A | * | 8/1994 | Niemeyer | 248/214 |
| 5,645,255 A | * | 7/1997 | Parduhn | 248/214 |
| 5,704,526 A | * | 1/1998 | Kuo | 224/425 |

* cited by examiner

Primary Examiner—Anita King
Assistant Examiner—Tan Le

(57) ABSTRACT

A brake cable retaining device includes a body having two retaining passages and a support member extends from said body and is located between said two retaining passages. The support member has a recessed surface defined therein. A U-shaped retaining member is mounted to said support member so as to retain a brake cable between said retaining member and said recessed surface.

3 Claims, 10 Drawing Sheets

BICYCLE BRAKE CABLE RETAINING DEVICE

FIELD OF THE INVENTION

The present invention relates to a bicycle brake cable retaining device that is suitable for retaining different size of brake cables and includes a retaining member which is snapped on the device and retains the brake cable.

BACKGROUND OF THE INVENTION

A conventional bicycle brake cable retaining device is shown in FIG. 1 and is made of a metal plate 1. Two ends of the metal plate 1 are curved to define two circular loops so as to let two brake cables 2 (only one is shown) extend through the two loops. In order to secure the brake cables 2, the user usually further clamps the two ends. This further action takes time. FIG. 2 shows another conventional brake cable retaining device that includes a plate with two hook portions 3 bending toward the same side of the plate from two opposite sides of the plate. The brake cable 2 is then retained by the two hook portions 3. However, the two hook portions 3 have a fixed size so that a larger brake cable cannot be well positioned. FIGS. 3 to 5 respectively show yet other types of brake cable retaining devices known to applicant. These conventional retaining devices include engaging slot(s) 4 to retain the brake cables 2. Nevertheless, none of them resolves the shortcomings of the conventional brake cable retaining member as shown in FIGS. 1 and 2.

The present invention intends to provide a brake cable retaining device that includes two retaining passages for general brake cables, and one retaining member that is snapped to the body of the device so as to retain a brake cable with a larger diameter.

SUMMARY OF THE INVENTION

In accordance with one aspect of the present invention, there is provided a brake cable retaining device comprising a body having two retaining passages defined therethrough and a support member extends from said body and is located between said two retaining passages. The support member has a recessed surface defined therein. A U-shaped retaining member is removably mounted to said support member so as to retain a brake cable between said retaining member and said recessed surface.

The object of the present invention is to provide a brake cable retaining device that has a retaining member snapped on a support member so as to retain a brake cable that has a larger diameter.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
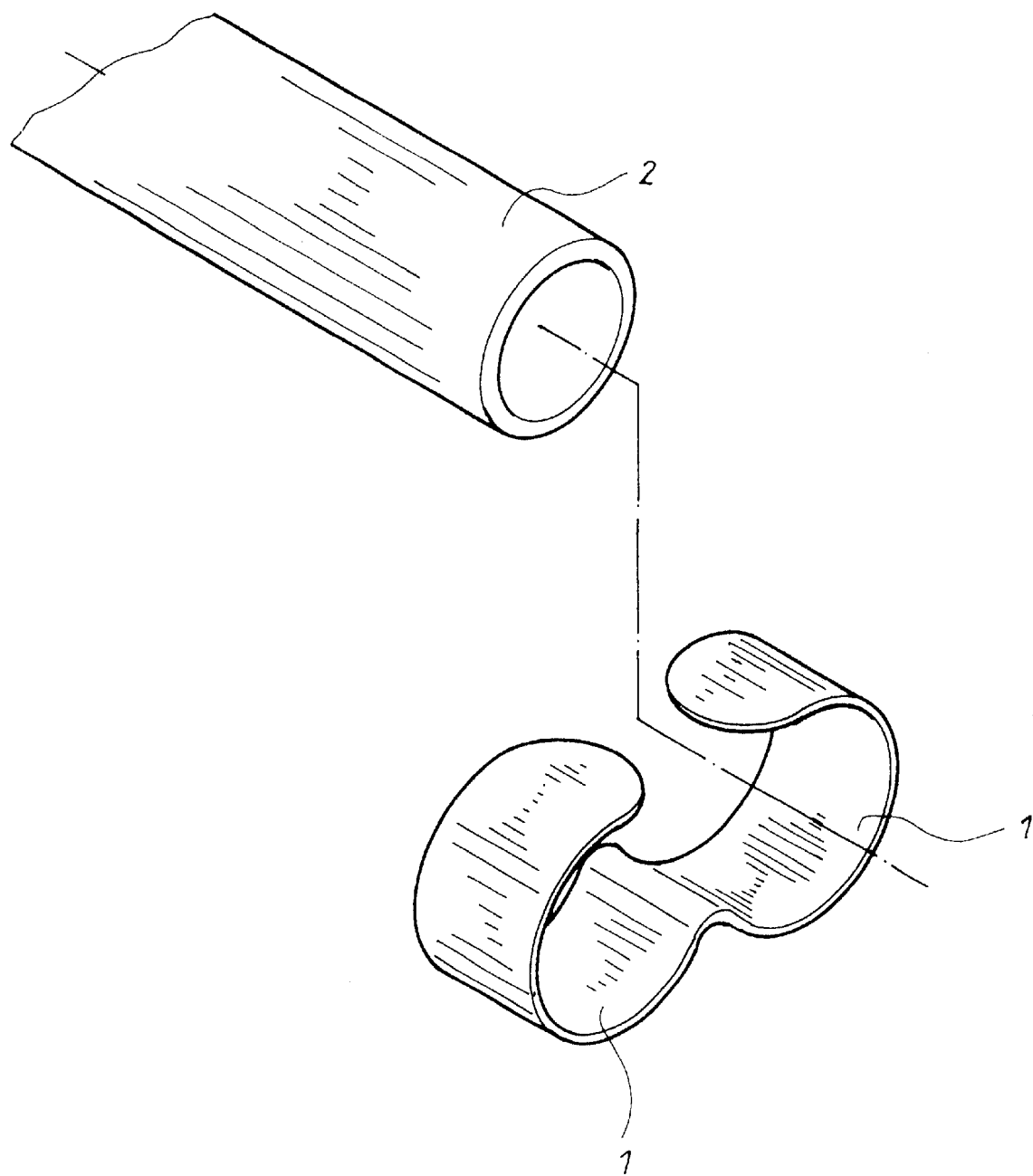
FIG. 1 is an exploded view to show a first conventional brake cable retaining device.
Figure 2:
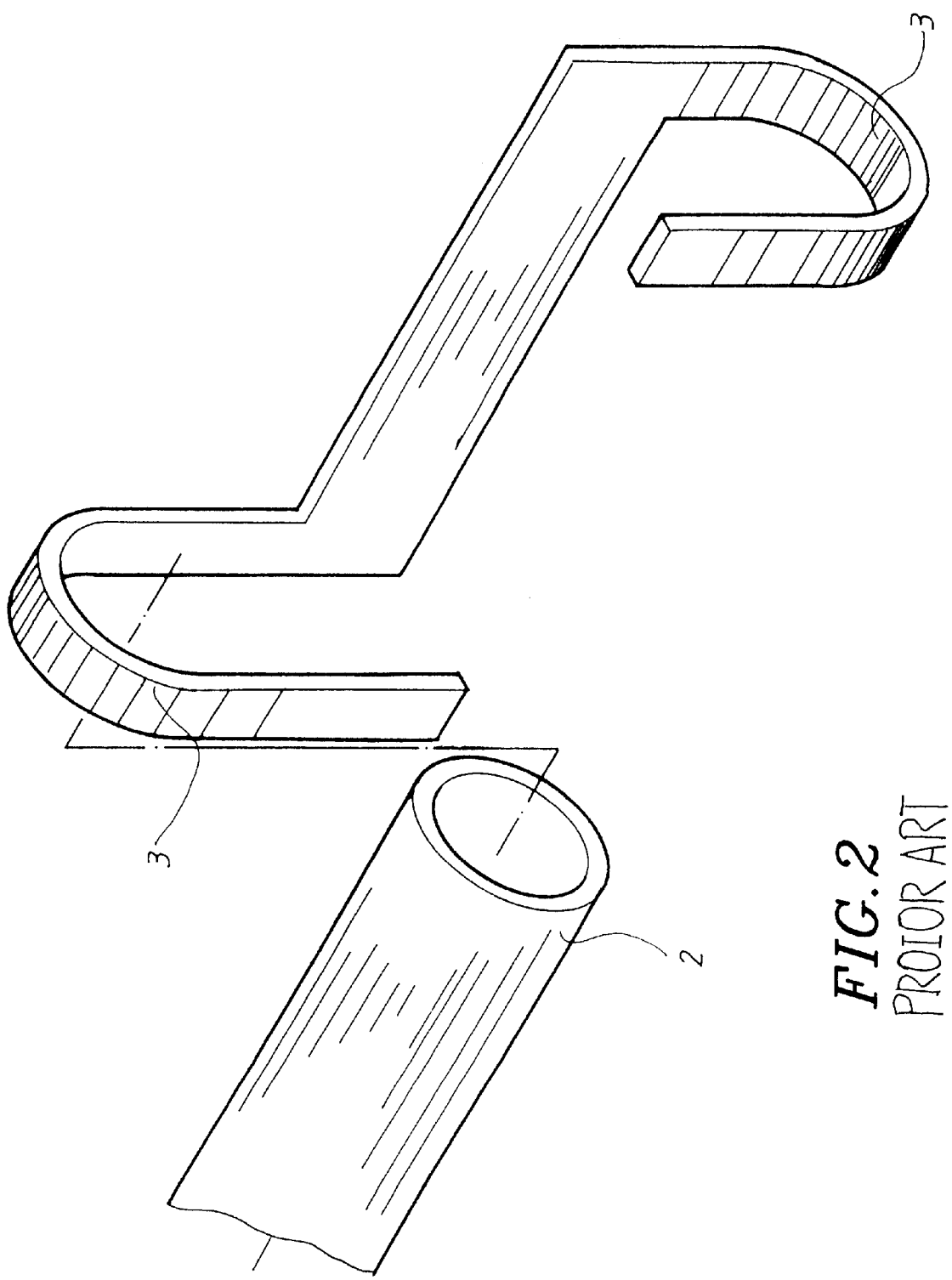
FIG. 2 is an exploded view to show a second conventional brake cable retaining device.
Figure 3:
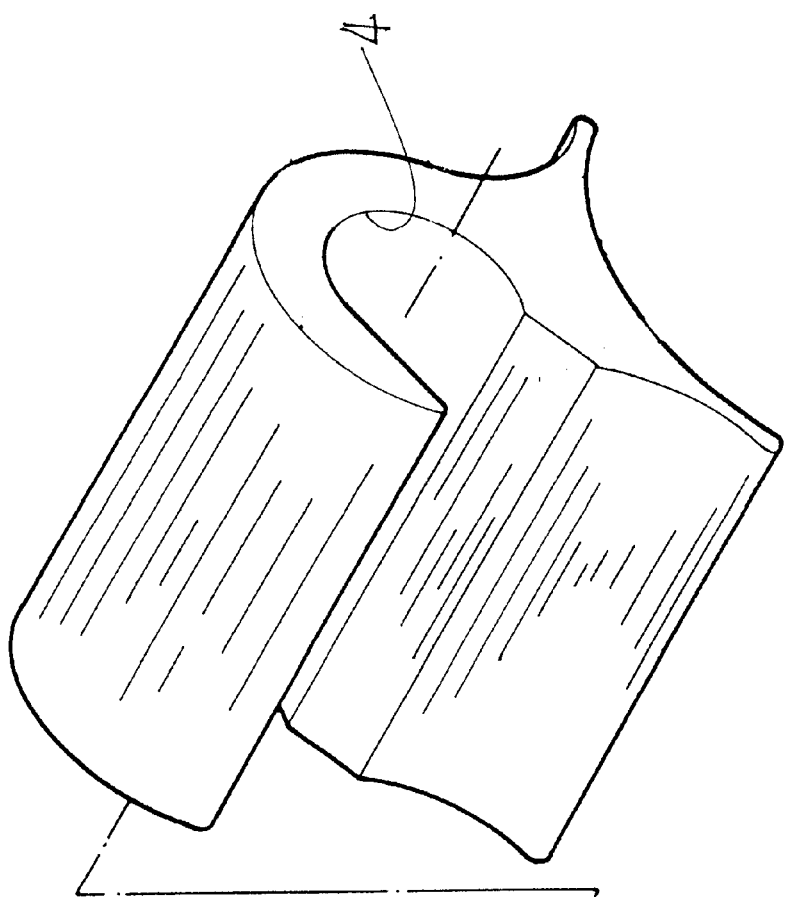
FIG. 3 is an exploded view to show a third conventional brake cable retaining device.
Figure 3:
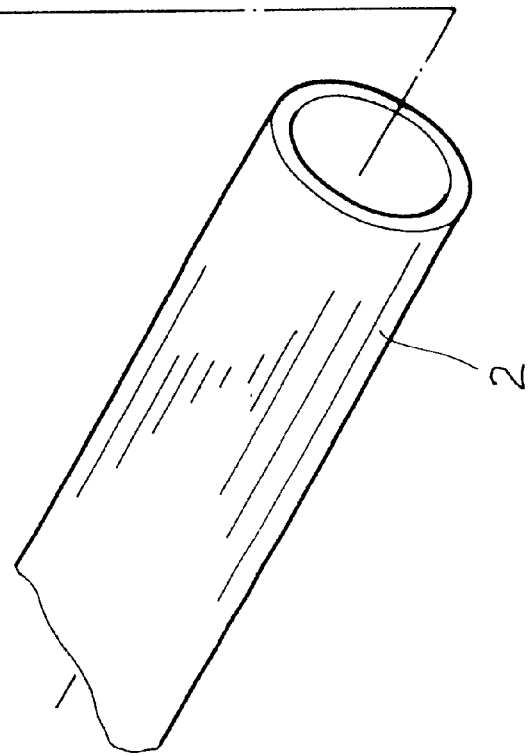
Figure 5:
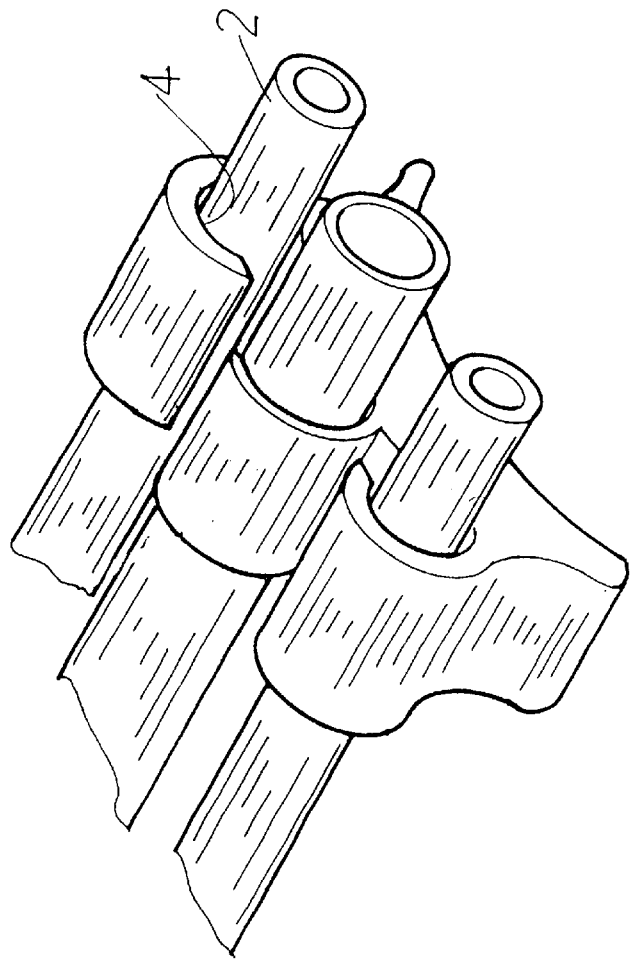
FIG. 5 is a perspective view to show a fifth conventional brake cable retaining device.
Figure 4:
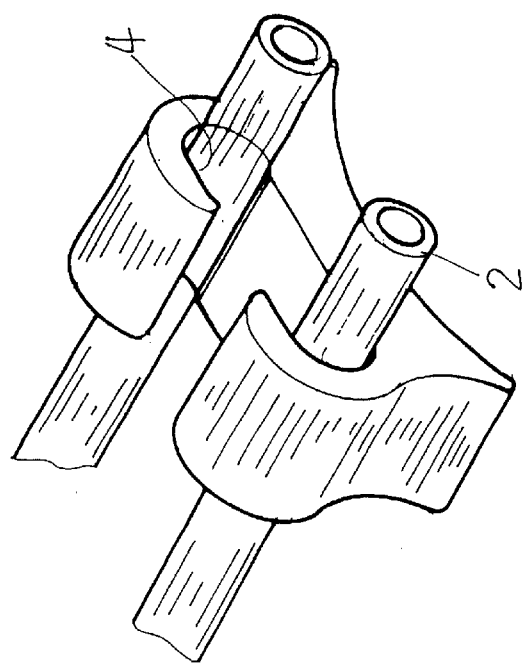
FIG. 4 is a perspective view to show a fourth conventional brake cable retaining device.
Figure 6:
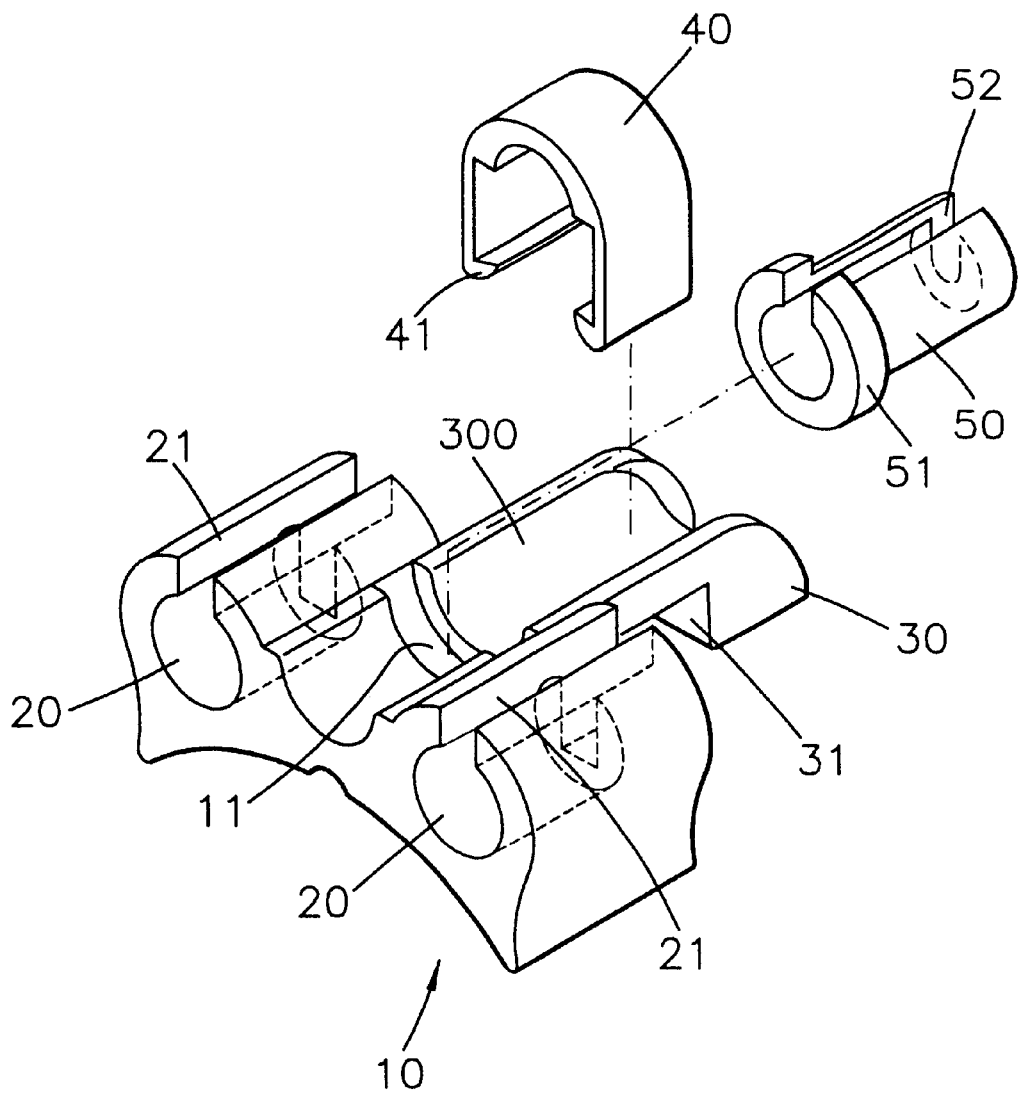
FIG. 6 is an exploded view to show a brake cable retaining device of the present invention.
Figure 7:
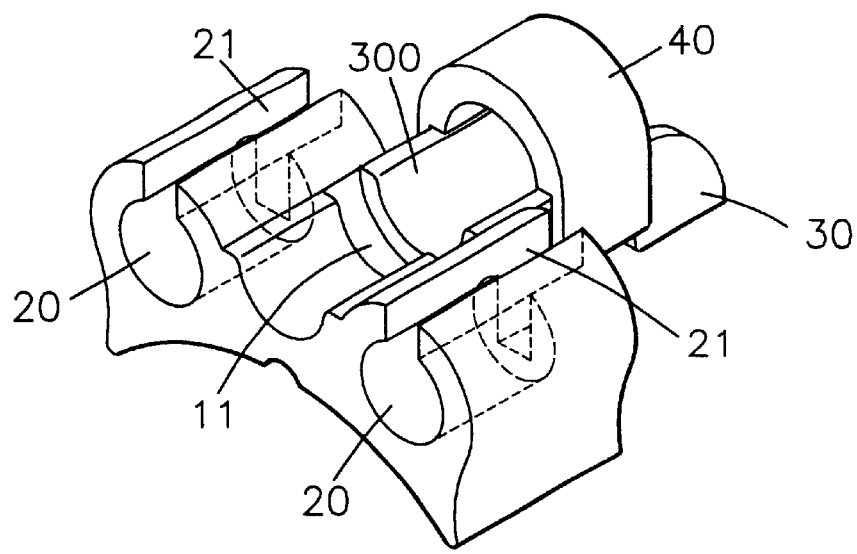
FIG. 7 is a perspective view to show the brake cable retaining device wherein a U-shaped retaining member is mounted to the support member of the device.
Figure 8:
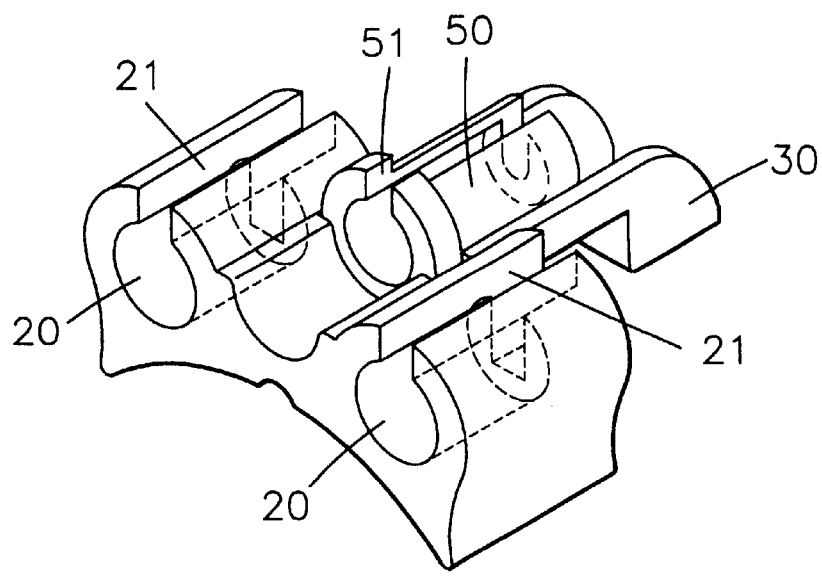
FIG. 8 is a perspective view to show the brake cable retaining device wherein an engaging tube is engaged with the support member of the device.
Figure 9:
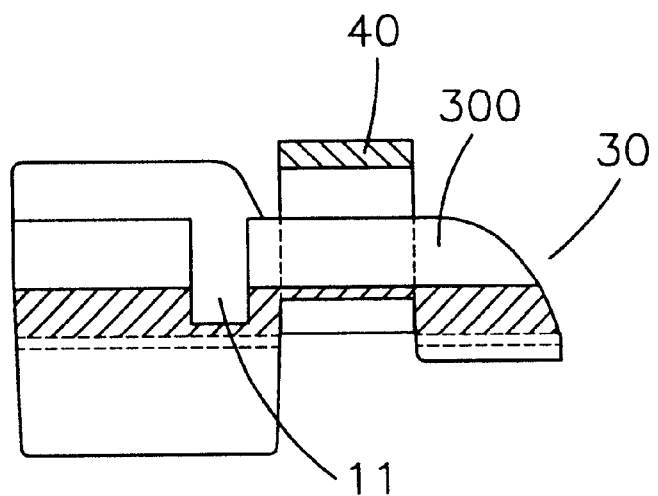
FIG. 9 is a side elevational view, partly in section, of the device with the U-shaped retaining member engaged with the support member.

Referring to FIGS. 6 to 8, the brake cable retaining device in accordance with the present invention comprises a body 10 having a recessed bottom so as to be connected to a bicycle frame. Two retaining passages 20 are defined through said body 10 and each retaining passage 20 has a slit 21 defined longitudinally through a periphery defining said retaining passage 20, wherein said slit 21 communicates with said retaining passage 20. Therefore, a brake cable is easily inserted into the retaining passage 20 via the slit 21. A support member 30 extends from said body 10 and is located between said two retaining passages 20. The support member 30 has a recessed surface 300 defined in a top thereof. A U-shaped retaining member 40 has two engaging hooks 41 on two ends thereof, said two hooks 41 being able removably engaged with two engaging notches 31 defined in two sides of said support member 30 as shown in FIG. 7 and FIG. 9.

Figure 10:
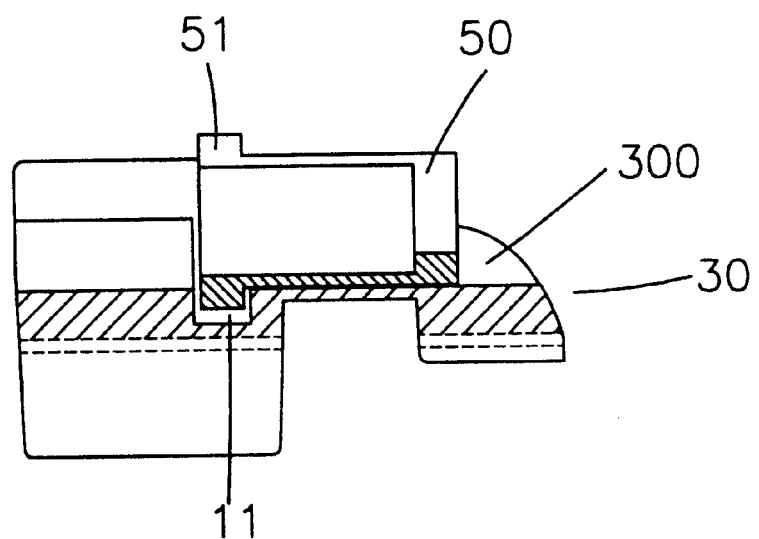
FIG. 10 is a side elevational view, partly in section, of the device with the engaging tube engaged with the support member.

A groove 11 is defined in said body 10 and located at one end of said support member 30. An engaging tube 50 has a flange 51 extending radially outward from one end thereof, said flange 51 securely engaged with said groove 11 and supported on said support member 30. The engaging tube 50 has a slit 52 defined longitudinally through a periphery thereof and said slit 52 communicates with an interior of said engaging tube 50 as shown in FIG. 8 and FIG. 10.

Figure 11:
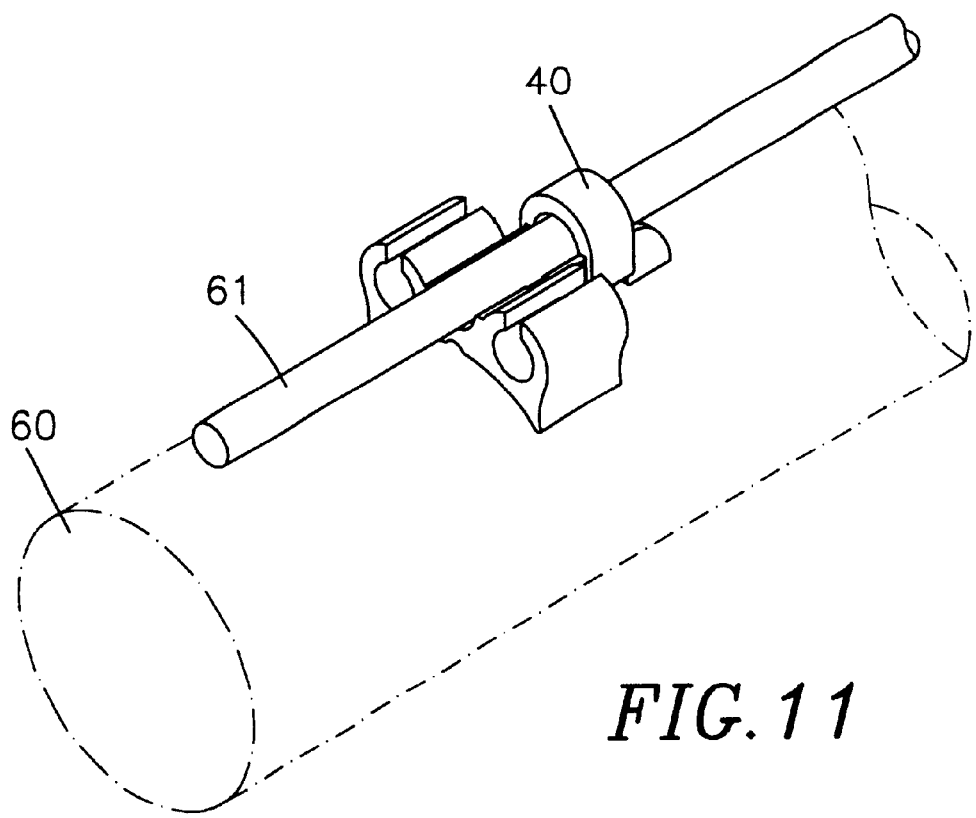
FIG. 11 is an illustrative view to show a brake cable is retained by the U-shaped retaining member.
Figure 12:
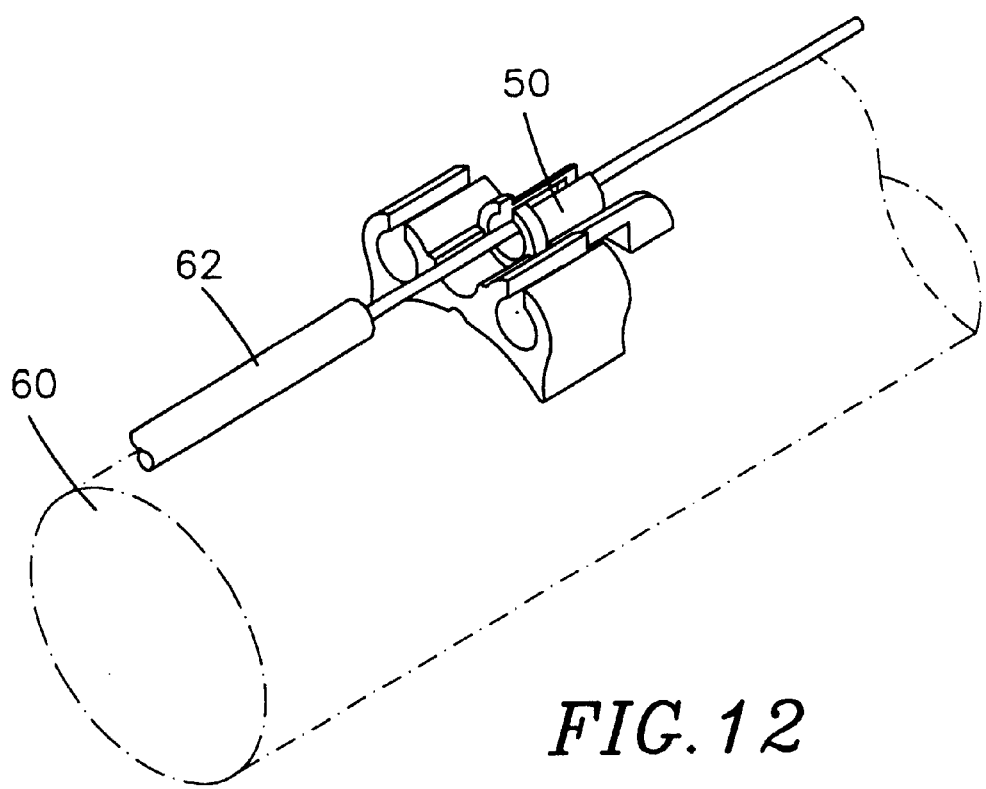
FIG. 12 is an illustrating view to show a brake cable is retained by the engaging tube.
Figure 13:
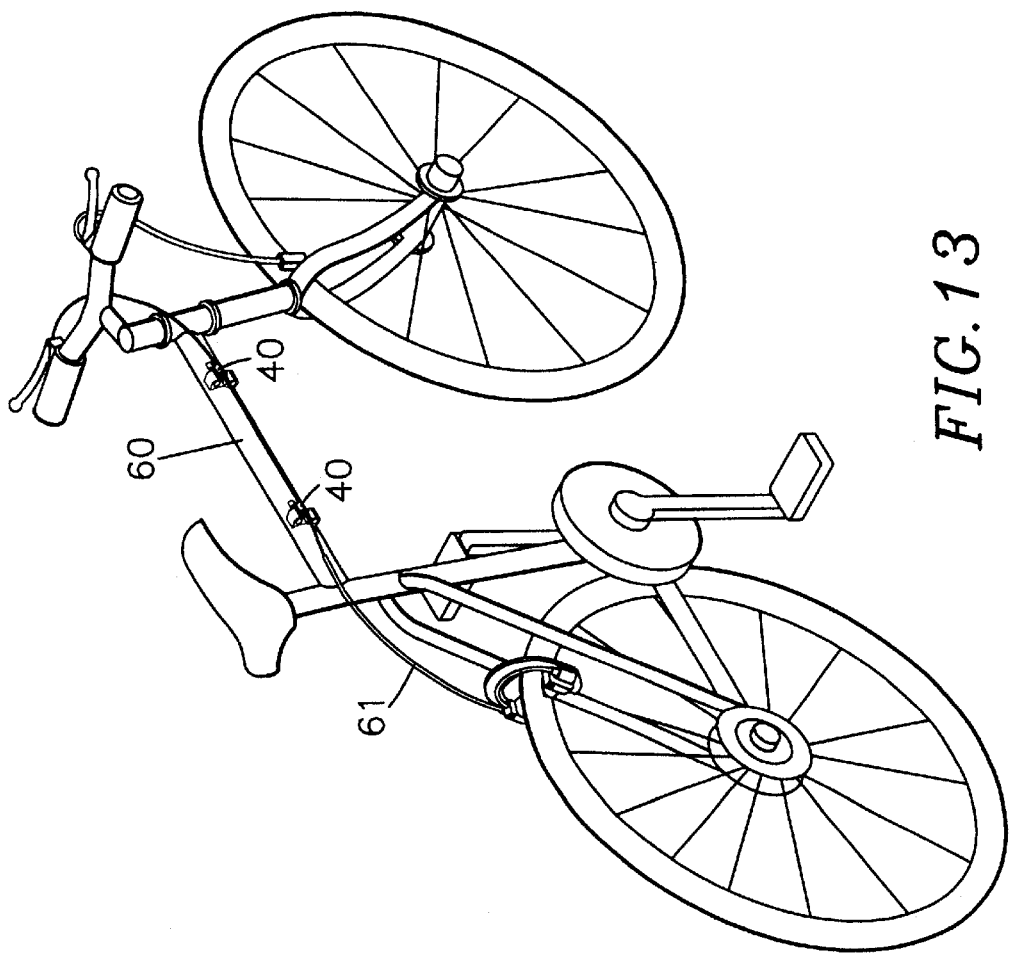
FIG. 13 is a perspective view to show a bicycle having the device connected thereto and the U-shaped retaining member is used to retain the brake cable.
Figure 14:
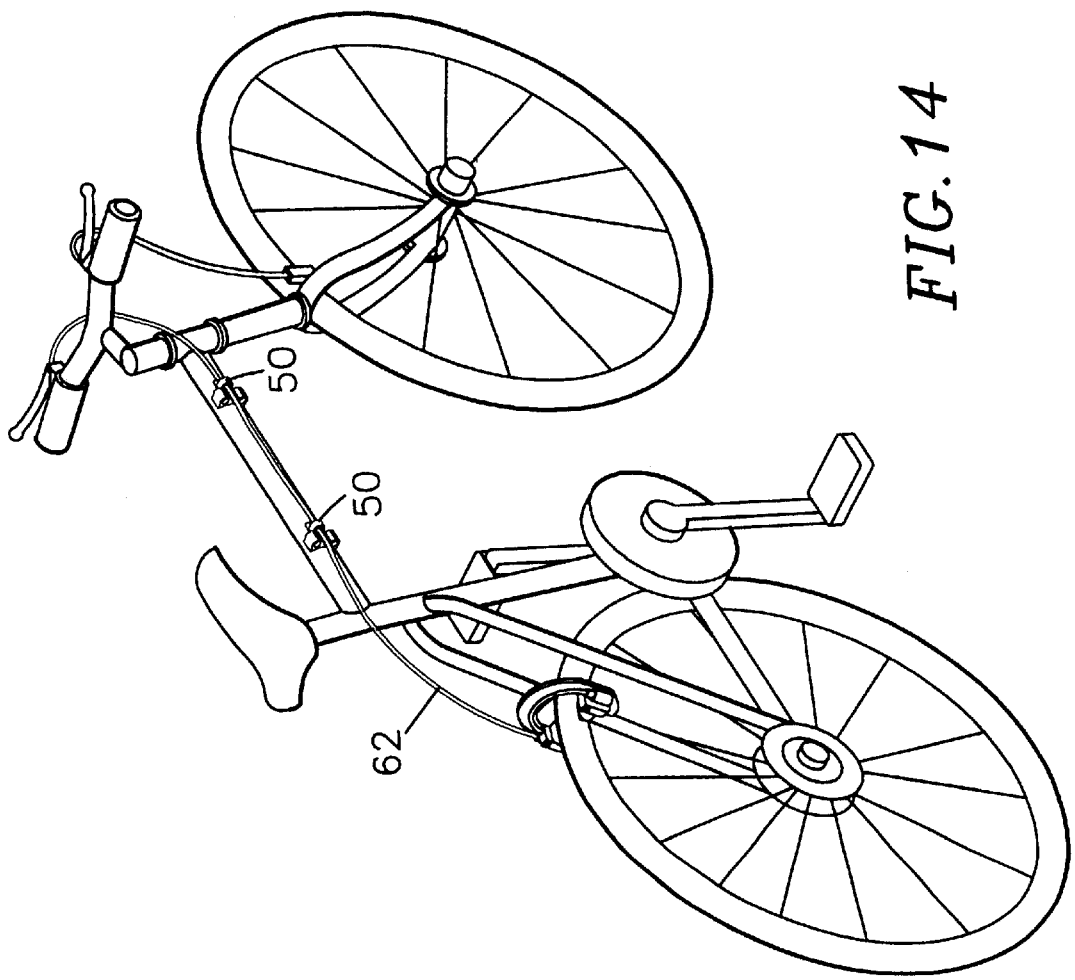
FIG. 14 is a perspective view to show a bicycle having the device connected thereto and the engaging tube is used to retain the brake cable.

As shown in FIGS. 11 and 13, the retaining device is fixedly connected to a bicycle frame 60 and a brake cable 61 that has a larger diameter is retained by the U-shaped retaining member 40. This brake cable 61 can be a tube used in a hydraulic brake system. As shown in FIGS. 12 and 14, a general brake cable 62 can then be retained by the engaging tube 50.

The U-shaped retaining member 40 and the engaging tube 50 are used depending on which size of the brake cables are to be retained.

While we have shown and described various embodiments in accordance with the present invention, it should be clear to those skilled in the art that further embodiments may be made without departing from the scope and spirit of the present invention.

What is claimed is:

1. A brake cable retaining device, comprising:

a body having two retaining passages defined through said body, a support member extending from said body and located between said two retaining passages, a groove defined in said body and located at one end of said support member, said support member having a recessed surface defined therein, and an engaging tube having a flange extending radially outward from one end thereof, said flange securely engaged with said groove and supported on said support member.

2. The device as claimed in claim 1, wherein each retaining passage has a slit defined longitudinally through a periphery defining said retaining passage and said slit communicates with said retaining passage.

3. The device as claimed in claim 1, wherein said engaging tube has a slit defined longitudinally through a periphery thereof and said slit communicates with an interior of said engaging tube.

* * * * *